(12) United States Patent
van Gool et al.

(10) Patent No.: US 6,420,517 B1
(45) Date of Patent: Jul. 16, 2002

(54) PROCESS FOR RESIN PHASE SEPARATION BY PLATE DECANTATION

(75) Inventors: Cornelius Adrianus Maria van Gool, Roosendaal; Martin Herke Oyevaar, Goes, both of (NL); Anthony Warren, Evansville, IN (US); Claude Tinney, Montgomery, AL (US); Mingjie Zhu, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/778,157

(22) Filed: Feb. 6, 2001

(51) Int. Cl.$^7$ .................................................. C08J 3/16
(52) U.S. Cl. ...................................................... 528/502
(58) Field of Search ........................................ 528/502

(56) References Cited

U.S. PATENT DOCUMENTS

| | | | |
|---|---|---|---|
| 3,957,656 A | | 5/1976 | Castelli |
| 4,025,489 A | * | 5/1977 | Bailey .......................... 260/47 |
| 4,316,009 A | | 2/1982 | Rinaldi et al. |
| 4,338,429 A | | 7/1982 | Serini et al. |
| 4,360,659 A | * | 11/1982 | Sikdar .......................... 528/196 |
| 4,368,315 A | * | 1/1983 | Sikdar .......................... 528/198 |
| 4,664,754 A | | 5/1987 | Caputi et al. |
| 5,260,418 A | | 11/1993 | Wulff et al. |
| 6,100,369 A | * | 8/2000 | Miyajima .................... 528/272 |

FOREIGN PATENT DOCUMENTS

| | | |
|---|---|---|
| DE | 19510061 | 9/1996 |
| DE | 19849004 | 4/2000 |
| GB | 2116447 A | 9/1983 |
| JP | 58223023 | 12/1983 |
| JP | 59087008 | 5/1984 |

OTHER PUBLICATIONS

PCT Search Report for PCT/US 00/25784.

* cited by examiner

Primary Examiner—Paul R. Michl

(57) ABSTRACT

This invention relates to an economical and efficient process for purifying a reaction mixture obtained in a two-phase interfacial reaction for the preparation of polycarbonate. More particularly, the method of the invention provides for separating the reaction mixture into an organic phase, which includes the desired polycarbonate and undesirable impurities, and an aqueous phase. The organic phase is further purified by using a plate decanter in combination with coalescence and centrifugation.

20 Claims, 3 Drawing Sheets

PROCESS FOR RESIN PHASE SEPARATION BY PLATE DECANTATION

The present application is a U.S. non-provisional application based upon and claiming priority from Patent Cooperation Treaty patent application Ser. No. US00/25784, filed in the U.S. receiving office on Sep. 21, 2000, which is hereby incorporated by reference.

SPECIFICATION

This invention relates to an improved process for the purification of polycarbonate containing solutions obtained in a two phase interfacial synthesis process. The process provides for the use of at least one plate decanter to separate and purify the polycarbonate containing solution.

BACKGROUND OF INVENTION

There are many well known processes for the preparation of polycarbonates from monomers. A preferred method is a two-phase interfacial process in which phosgene is contacted with aromatic bisphenols and condensed to produce high molecular weight polycarbonates.

The two-phase interfacial process results in a reaction mixture which is an emulsion of organic and aqueous alkaline phases. In order to recover the polycarbonate product from the organic phase in which it is found, the reaction mixture must first be separated into its organic and aqueous alkaline phases, and the organic phase must be further processed to remove undesirable impurities including electrolytes, catalysts, residues of chain terminators, and unreacted starting materials.

Typically, such reaction mixtures contain polycarbonate polymers with molecular weights up to 250,000 g/mol on a polycarbonate basis and brine present in an amount around one quarter by weight of the reaction mixture. Further, the reaction mixtures may exhibit a wide range of viscosities. In conventional processes, the initial separation of the aqueous alkaline phase from the organic phase is not complete, but leaves the organic phase containing some ten percent or more of an aqueous component. Further, the organic phase contains residual impurities such as catalysts, residues of chain terminators, and unreacted bisphenols. Thus, additional steps are required to purify the organic phase.

For example, U.S. Pat. No. 4,338,429 describes removing alkali metal hydroxide, catalyst, and salts from the organic phase by repeated settling or centrifugation, with the addition of either aqueous acid or water in each step. The process is enhanced by the addition of shear energy and/or cationic emulsifying agents and dispersing agents to the aqueous acid step, or water-soluble organic anionic compounds to the water step.

Another method for purifying the organic phase is coalescence, as described in U.S. Pat. No. 4,316,009 and German Patent DE 19510061. The continuous process described therein involves washing and reemulsification, followed by reseparating the two phases by conveying the emulsion through a layer of fibers that causes coalescence of the separate phases.

Another method for purifying the organic phase is to employ a series of centrifuges to remove the residual aqueous component by application of very high gravitational forces, as described in U.S. Pat. No. 5,260,418. In this process, the separated organic phase is further contacted with water and various aqueous solutions to bring the impurities into the aqueous component, which is removed and discarded.

Phase separation and purification processes employing centrifuges are time consuming and expensive to install and operate. Moreover, alternative purification methods such as extraction by countercurrent water washing and gravity separation of the two phases are much slower and less efficient. Accordingly, there is a need to provide a method for the separation and purification of reaction mixtures resulting from the two-phase interfacial process for making polycarbonate which is efficient and economical.

SUMMARY OF THE INVENTION

Therefore, it is an object of the present invention to provide an economical and efficient process for the separation and purification of a reaction mixture obtained in a two-phase interfacial process for making polycarbonates.

These and other objects of the invention are obtained by introducing the reaction mixture into a separation device comprising at least one plate decanter thereby separating the reaction mixture into an organic phase and an aqueous phase. The separation may be carried out using a combination of plate decanters, coalescers decanters, and centrifuges, which are operated in series or in parallel. Plate decanters in combination with such other devices provide efficient and effective separation of the reaction mixture into an organic phase containing the polycarbonate, and an aqueous waste phase.

In one embodiment, two plate decanters are operated in series. The plate decanters in series may precede or follow other separation devices, or may receive reaction mixture effluent directly from a reactor.

In an alternate embodiment, the separation devices are combined in a plate decanter/coalescer decanter array comprising a plurality of units comprising at least one plate decanter. The array comprises m rows where each row consists of n units in series, in which the organic phase output of each unit is connected with the outputs of units having the same value of n in other rows. The organic phase outputs of the last unit of each row of the array are combined thereby separating a reaction mixture into an organic phase and an aqueous phase. The organic phase may be conveyed into a series of centrifuges, and then into another array in a repetitive process.

By the process of this invention it is possible to separate and purify the reaction mixture in a highly efficient and economic manner.

BRIEF DESCRIPTION OF THE DRAWINGS

For a better understanding of the present invention and its objects, reference is made to the detailed description below to be considered in light of the complete application, the scope of this invention as pointed out in the appended claims, and in combination with the drawings of which:

DETAILED DESCRIPTION OF THE EMBODIMENTS

Figure 1:
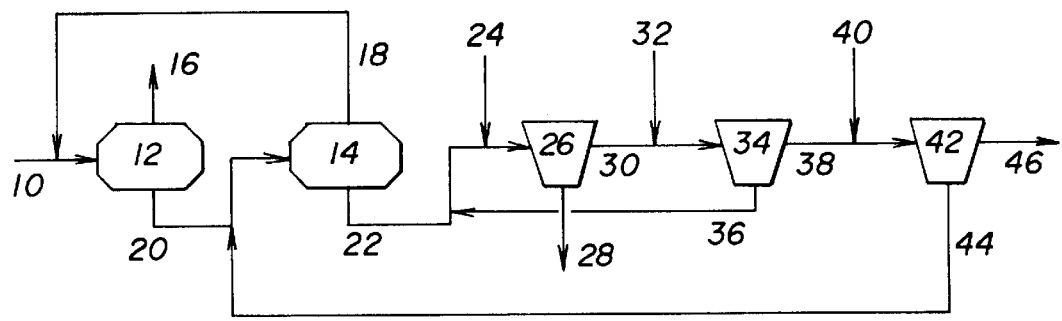
FIG. 1 is a schematic of a separation network which includes two plate decanters and three centrifuges arranged in series in accordance with the invention.

This invention provides a process for the separation and purification of reaction mixtures obtained in the process for preparation of polycarbonate by two-phase interfacial polymerization. The process of this invention employs one or more plate decanter separation devices in combination with coalescer decanters and/or centrifuge type separation devices.

The reaction mixture to be separated with this invention is the effluent from a resin reactor producing polycarbonate. Polycarbonate can be produced in batch or continuous mode by a two-phase interfacial process. The resin reactor effluent comprises a heavy organic component including the desired polycarbonate and a light aqueous inorganic component. Typically, the ratio of the aqueous phase to the organic phase is 10:90 to 70:30 weight percent. The polycarbonate component is typically present in an amount of 10 to 20 weight percent. The polycarbonate contained in the effluent may have, but is not limited to, molecular weight from about 15,000 to about 40,000 g/mol on a polycarbonate basis. Consequently, the effluent may have a wide range of viscosities. The effluent may also have, but is not limited to, a salt concentration of 14–22 weight percent.

The plate decanter consists of a container having a long axis which is oriented at an angle with respect to gravity, the angle typically being from 30° to 60°, preferably about 45°. The decanter is filled with plates, which also are therefore at the same angle. Preferably, the plates have a corrugated structure. A fluid mixture to be separated is introduced into the top of the plate decanter, and under the influence of gravity the heavier phase flows to the bottom of the decanter while the lighter phase flows to the top. The principles governing gravity decantation of an emulsion are based on Stoke's Law. For example, in a decanter, as the difference in density between the dispersed and continuous phases of an emulsion increases, the separation time decreases.

The use of a plate decanter can be combined with coalescence devices. Coalescence is the process by which droplets of the dispersed phase of an emulsion are brought together to form a continuous phase. It is known to those of skill in the art that coalescence of polycarbonate dispersions can be achieved by conducting the dispersion through a layer of fibers, preferably glass, steel, or polymeric fibers.

More particularly, coalescing elements are added to the interior of an empty decanter. Preferably, the coalescing elements are a combination of metal and teflon such as elements available from Otto York. The coalescing size and number so as to provide a residence time in the decanter of 3 to 15 minutes, preferably, 1.5 to 2 minutes. The combination of a plate decanter with coalescing devices and/or centrifuges is an embodiment of this invention.

In an alternate embodiments, one or more plate decanters is combined with other separation devices including decanter coalescers and centrifuges. Various combinations of these devices can be used to separate polycarbonate reactor effluent.

In a preferred embodiment detection of the location interface of the two separated phases in a decanter can be improved by utilizing a sonar or ultrasonic probe. A sonic wave is sent from the clear aqueous phase toward the interface with the polycarbonate resin containing phase. The echo from the interface is used to determine the interface location. By determining the location of the interface more precisely, cross contamination of separated phases upon transfer is minimized.

In preferred embodiments of the invention, the operating temperatures for all streams are from 60° to 100° F. and more preferably 80–100° F. The operating pressures for all streams are preferably 0–100 psig, more preferably 30–80 psig, and most preferably 30–80 psig (pounds per square inch guage).

In the embodiment shown in FIG. 1, plate decanters may be combined with centrifuges, to separate a reaction mixture. A reaction mixture 10 can be introduced into a series of separation devices including first 12 and second 14 plate decanters which will separate the emulsified reaction mixture into first 16 and second 18 lighter aqueous phases, and first 20 and second 22 heavier organic phases. Preferably, the residence time in each of the plate decanters is 5 to 6 minutes. The lighter aqueous brine phase 16 will be removed from the plate decanter 12 and discharged. The second lighter aqueous phase 18 will be removed from the second plate decanter 14 and recycled back into the original reaction mixture 10. The second heavier organic phase 22 will be acidified with HCl 24 and separated in a first centrifuge 26. The wastewater 28 will be removed from the first centrifuge 26 and the organic phase from the first centrifuge 30 will be mixed with water 32 and added to a second centrifuge in series 34. The wastewater 36 from the second centrifuge 34 will be recycled with organic phase 22 from the second decanter 14 The organic phase from the second centrifuge 38 will be mixed with water 40 and added to a third centrifuge 42 after centrifugation. The wastewater 44 from the third centrifuge 42 will be recycled with organic phase 20 from the first decanter 12.

This invention is not limited to embodiments consisting of regular arrays, but is also directed to embodiments in which the reaction mixture is conducted into a separation network comprising a plurality of plate decanters and a plurality of coalescers which are operated in series or in parallel in any order and in any combination. The outputs of the plate decanters and coalescer decanters may be combined in any order, thereby separating the reaction mixture into an organic phase and an aqueous phase. The organic phase from the network may be conducted into a series of centrifuges, and then into another network in a repetitive process.

Figure 2:
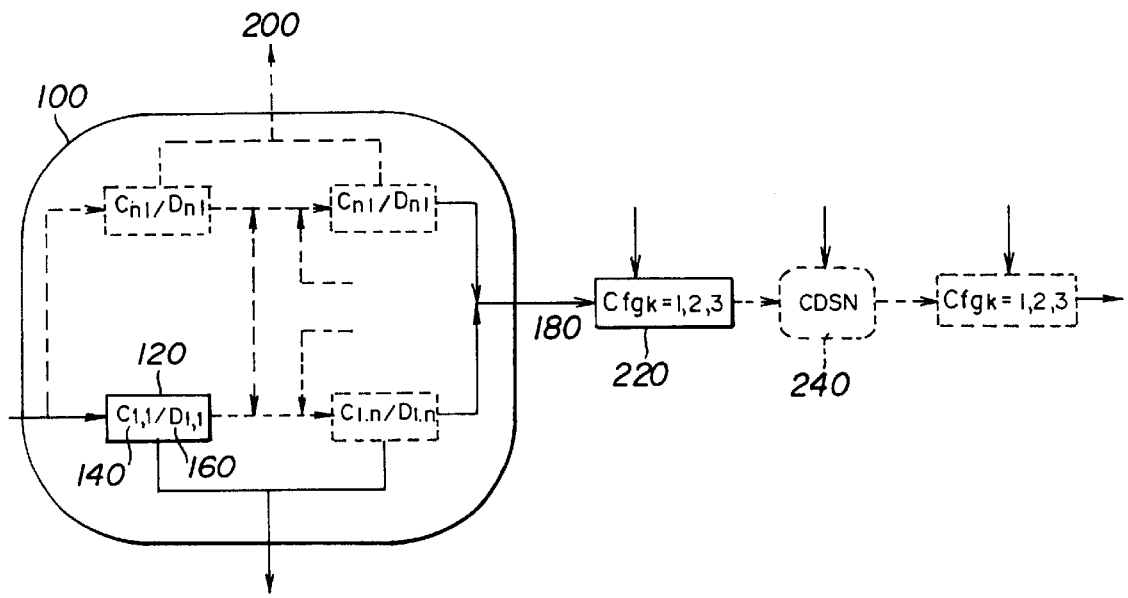
FIG. 2 is schematic illustrating an array of plate decanter and, optionally coalescer decanters, used to form a separation network in combination with centrifuges in accordance with the invention.

FIG. 2 illustrates an alternate embodiment in which an array 100 of plate decanters and decanter coalescers is used for the separation of the reaction mixture containing polycarbonate. The array hereinafter referred to as a Coalescer/Decanter Separation Network, "CDSN" comprises a plurality of units 120 consisting of a plate decanter 160 and/or decanter coalescers 140. The array comprises m rows where each row consists of n units in series, and in which the organic phase output of each unit is connected with the outputs of units having the same value of n in other rows. The organic phase outputs of the last unit of each row of the array are combined thereby separating a reaction mixture into an organic phase 180 and an aqueous phase 200. The organic phase may be conducted into a series of centrifuges 220, and then into another array in a repetitive process. The series of centrifuges, "$Cfg_k$" 220 where k=1, 2, 3 . . . etc, can be used for acid or water washing of the organic phase. Optionally, the resulting organic phase 190 obtained may be separated in a second array 240. The second array of separation devices CDSN, may be the same or different than the first array of separation devices.

When one separation device is operated in "series" to a second separation device, it is meant that the output of one device, for example the organic phase output, is provided as the input to the second device. Thus, a "series of devices" means a plurality of devices operating in series pairwise to form one serial chain. When one separation device is operated in "parallel" to a second separation device, it is meant that the corresponding outputs of each device, for example the organic phase outputs, are combined to provide one stream in a further process.

In all embodiments of this invention, the separation devices operate to divide the dispersion into light and heavy phases. In addition to the input of a polycarbonate dispersion, each device may have inputs at various points for charging water or other solutions, including charging heavy or light phases conducted to the device from another portion of the process. Each device may also have more than one point from which particular outputs, for example the light phase, are conducted.

The following examples further describe and demonstrate embodiments within the scope of the present invention. The examples are given solely for the purpose of illustration and are not to be construed as limitations of the present invention.

EXAMPLE 1

A plate decanter was tested on a polycarbonate resin separation line consisting of three centrifuges. A primary centrifuge was used for resin and brine separation. A second centrifuge was used for acid washing the resin solution to reduce the chloride concentration in the third centrifuge to avoid excessive corrosion in the third centrifuge.

In order to test the use of a plate decanter, a 200 liter decanter unit from Esmitec/FIB was tested on the discharge of a feed pump of the resin separation line. The separated light and heavy organic phases from the top and bottom of the decanter were fed back to the input of the centrifuge feed pump.

The gravity decanter consisted of a pipe of 2.6 meter length and a diameter of 300 mm. The decanter was filled with 11 plates, as supplied by Estimtec/FIB. The distance between the plates was 26 mm. The feed entered the unit from the top. To prevent backwashing from the light water phase by the feed, flow collection trays were installed in the top section above the highest points of the plates. The separation zone was 1200 mm long. The decanter had an angle of 45 degrees with the horizon. The discharge piping was constructed such that the interface of the two separated phases was above the plates.

The feed mixture of the decanter consisted of both an aqueous phase, brine or wash water, and an organic phase, polycarbonate resin dissolved in methylene chloride. The feed mixture entered the decanter through a 1" feed line and was distributed by a splash plate located internally 15 mm after the end of the inlet pipe over the plates. The splash plate diameter 130 mm for a 60 mm pipe). The aqueous phase, being the light phase, flows to the top of the decanter while resin solution flows to the bottom. The feed flow was varied and adjusted by the visual inspection of the water phase. When large droplets of heavy phase were seen in the light phase sight glass, the feed flow was reduced.

For testing the decanter as an input device for the first centrifuge, separation efficiency was detected at the second centrifuge. A resin solution sample i.e. the heavy phase was removed at the second centrifuge and mixed with 10 vol % pure distilled water, stirred, and separated. The separated water was analyzed for chloride. The water phase was sampled and visually inspected, and judged on the same basis as a water sample from the centrifuge.

A base-line study conducted over a period of eight weeks before installing the decanter gave an average chloride concentration in the water discharge of the second centrifuge of 7184 mg/L solution, maximum 10678, minimum 3964, standard deviation 1972. This corresponds to a carryover of 1.39 weight percent brine in the output organic phase from the first centrifuge.

By comparison, the heavy phase leaving the decanter was sampled and analyzed for chloride. The average chloride concentration in this extraction water was 2766, standard deviation 2523, brine carry-over 0.53%.

This test showed very good separation on both phases at a feed flow of 1600 to 2000 lt./hr. During the total test time of 4 weeks no rag layer formation at the interface was observed.

EXAMPLE 2

A reaction mixture containing polycarbonate can be prepared using an interfacial reaction process. Such a reaction mixture may be separated and purified using two plate decanters and three centrifuges in accordance with the process shown in FIG. 1. A calculation using mass balance assuming an input stream composition, brine carry-over and polycarbonate content in accordance with Example 1 was performed.

The results are summarized in Table 1 where PC=polycarbonate, $MeCl_2$=methylene chloride, BPA=bisphenol A and TEA is triethylamine. Final outflow of the purified organic phase consisted of 0.5 weight percent water carryover.

EXAMPLE 3

Figure 3:
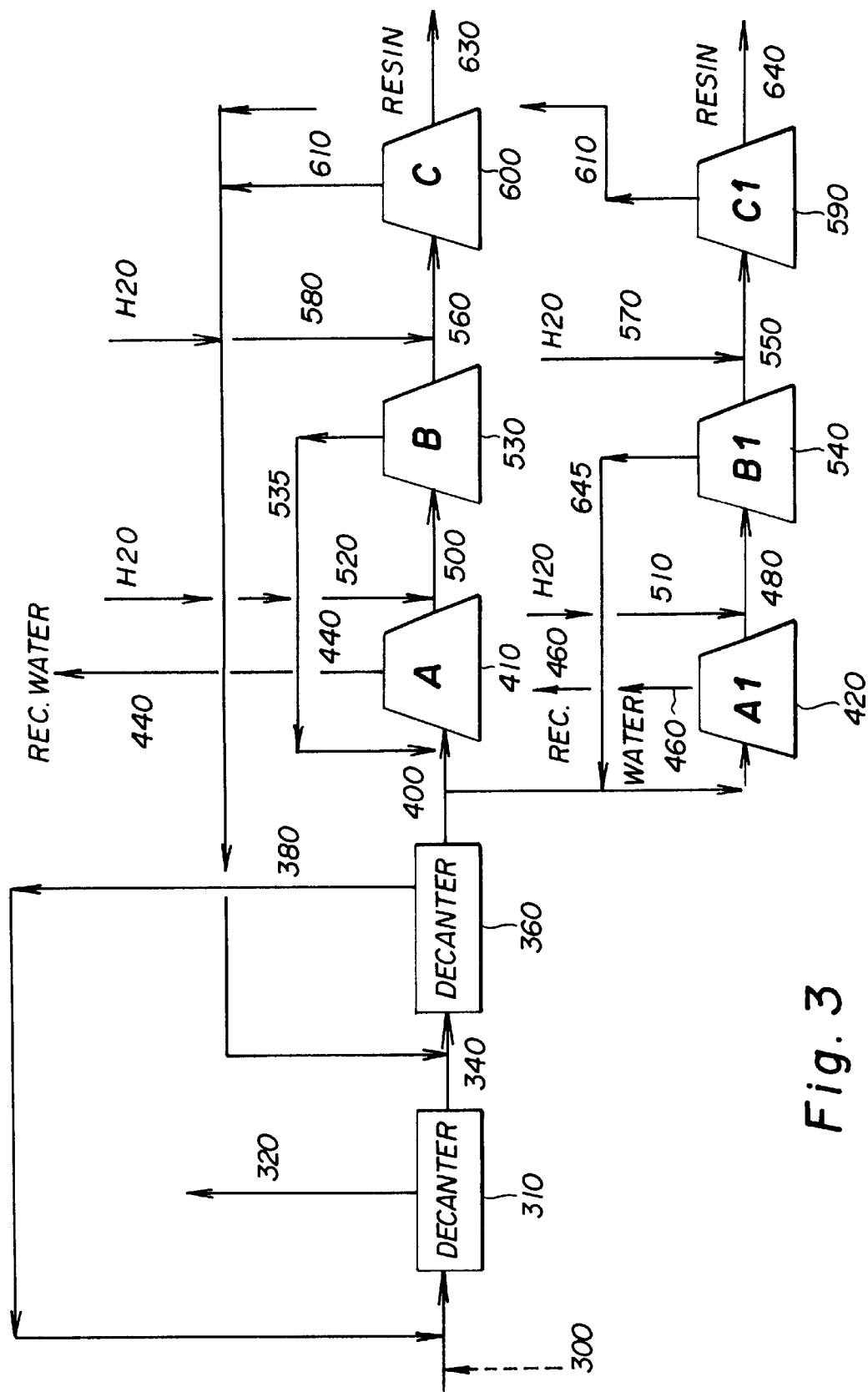
FIG. 3 is a schematic illustrating a separation network which includes two plate decanters in series before six centrifuges arranged in parallel in accordance with the invention and FIG. 4 is a sectional view of a plate decanter including a sonar probe in accordance with the invention.

An alternate separation network including two plate decanters in series in continuation with two sets of three centrifuges in parallel is shown in FIG. 3 Effluent 300 from a plant reactor preparing polycarbonate using a two phase interfacial process is introduced into a plate decanter 310 which separates the effluent into a lighter brine phrase 320 and a heavier organic phase 340. The lighter brine phase is discarded. The heavier organic phase 340 is introduced into a second decanter 360. The second lighter phase 380 is removed from the second decanter 360 and recycled back into the effluent 300. The second heavier organic phase 400 is split. A portion of the second organic phase 400 is received by centrifuge A 410 and the reminder is received by centrifuge A1 420. The lighter aqueous phases 440 and 460 are removed from centrifuge A and A1, respectively and recycled for the water content. The heavier organic phases 480 and 500 are removed from centrifuge A and A1, mixed with water 510 and 520 and added to the second centrifuges in series B, 530 and B1, 540, respectively. The light aqueous phases 535 and 545 are removed from the B and B1 centrifuges, are recycled with heavy phase 400 from the second decanter 360. The heavy phases 550 and 560 are removed from the B and B1 centrifuges mixed with water 570, 580 and added to centrifuge C 600 and C1 590, respectively. The light aqueous phases 610 and 630 are removed from centrifuges C and C1 and recycled with heavy phase 340 from decanter 310. The heavy phrases 630 and 640 are removed from centrifuges C and C1 and polycarbonate resin obtained therefrom.

EXAMPLE 4

Figure 4:
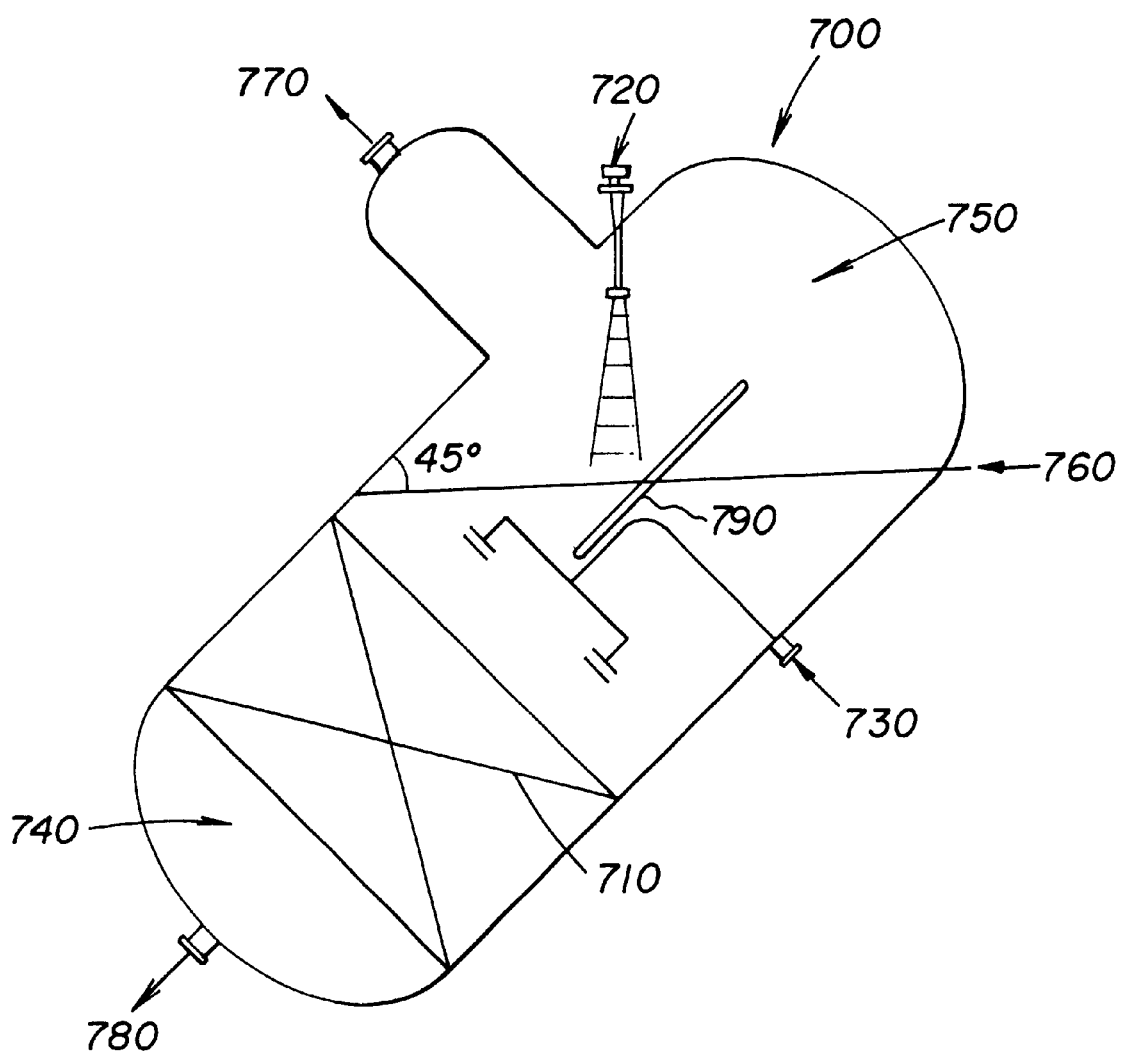

A reactor effluent solution having a polycarbonate concentration of 10–18 weight per cent in the organic phase and a brine or aqueous phase having a specific gravity of 1.0 to 1.16 was fed into and removed continuously from a plate decanter. The feed rate provided a residence time in the decanter of between 10 to 30 minutes. Continuous operation and a limited residence time created some waves or turbulence around the interface which made interface detection difficult. The decanter 700 was fitted with plate bundle 710 and a sonar probe 720 of the top-down type available from Accu-Gage as shown in FIG. 4. Effluent solution entered the decanter 700 through feed inlet port 730. The effluent separated into an organic phase 740 and a brine phase 750 with interface 760 therebetween. The lighter brine phase was removed through the brine outlet 770 located at the top of the decanter and the heavier organic phase was removed through the organic phase outlet 780 at the bottom of the decanter. Optionally, additional plates may be placed in brine outlet 770 which may improve separation. The results of the interface measurement using the probe as compared with visual observations using a sight glass 790 on the outside of the decanter are given in Table 2.

TABLE 2

| | |
|---|---|
| Average measurement errors | 4.98 cm |
| Standard Deviation of Measurement Errors | 2.62 cm |
| Number of Measurements | 93 |
| Measurement range | 0–50 cm |

The average measurement errors reported in Table 2 is the difference between the average value of the interface location obtained using the 93 probe measurements versus the average of 93 visual observations. The standard deviation of measurement errors was calculated from the sonar probe measurements and average sonar probe value. The average measurement errors should be reduced by recalibration of the probe transducer. In addition, there was a contribution to the standard derivation of measurement errors by the visual observation measurement due to wave formation at the interface and the large size of the decanter. Other test probes such as differential pressure or nuclear probes yielded less accurate and less reliable results than the sonar or ultrasonic probe.

While there have been described illustrative embodiments of this invention, those skilled in the art will recognize that they may be changed or modified without departing from the spirit and scope of this invention, and it is intended to claim all such changes and modifications that fall within the true scope of the invention as set forth in the appended claims. All documents referenced herein are specifically incorporated by reference in their entirety.

What is claimed is:

1. A continuous process for the removal of impurities from a reaction mixture comprising polycarbonate, comprising:
   (a) providing a reaction mixture from a two-phase interfacial reaction for the preparation of polycarbonate; and
   (b) conveying the reaction mixture into a separation device comprising at least one plate decanter thereby separating the reaction mixture into an organic phase and an aqueous phase.

2. The continuous process according to claim 1, further comprising conveying the organic phase from the plate decanter into at least one centrifuge thereby separating a wastewater phase from the organic phase.

3. The continuous process according to claim 1, further comprising conveying the organic phase from the at least one plate decanter into at least one coalescer decanter thereby separating a wastewater phase from the organic phase.

4. The continuous process according to claim 3, further comprising conveying the organic phase from the at least one coalescer decanter to at least one centrifuge thereby separating a wastewater phase from the organic phase.

5. The continuous process according to claim 1, further comprising conveying the organic phase from the at least one plate decanter into a first centrifuge of a cascade of centrifuges $Cfg_k$ arranged in series thereby separating a wastewater phase $W_k$ from the organic phase $O_k$ and conveying the separated organic phase to the next centrifuge $Cfg_k$ in series which separates the conveyed $O_{k-1}$ phases into an organic phase $O_k$ and a wastewater phase $W_k$.

6. The continuous process according to claim 5 wherein k=1, 2 or 3.

7. The continuous process according to claim 1, further comprising conducting the organic phase from the at least one plate decanter into a cascade of coalescer decanters $C_n$ arranged in series thereby separating a wastewater phase $W_n$ from the organic phase $O_n$ end conveying the organic phase $O_{n-1}$ into the next coalescer decanter $C_n$ in series and separating an organic phase $O_n$ and a wastewater phase $W_n$.

8. The continuous process according to claim 1 further comprising conveying the organic phase from the at least one plate decanter into each of the first cascade of two sets of three centrifuges $Cfg_k$ arranged in parallel, wherein k=1, 2, 3, 4, 5, or 6 wherein $Cfg_1$, $Cfg_2$, $Cfg_3$, are arranged in series and $Cfg_4$, $Cfg_5$, and $Cfg_6$ are arranged in series thereby separating a wastewater phase $W_k$ from an organic phase $O_k$ and conveying organic phase $O_{k-1}$ into the next centrifuge in series which separates the conveyed $O_{k-1}$ phase into an organic phase $O_k$ and a wastewater phase $W_k$.

9. A continuous process for the removal of impurities from a reaction mixture comprising polycarbonate, comprising:
   (a) providing a reaction mixture from a two-phase interfacial reaction for the preparation of polycarbonate;
   (b) conveying the reaction mixture into a separation device comprising a first plate decanter thereby providing effluent from the first plate decanter consisting of a first organic phase and a first aqueous phase; and
   (c) conveying the first organic phase from the first plate decanter into a second plate decanter thereby separating the first organic phase into a second organic phase and a second aqueous phase.

10. The continuous process according to claim 9, further comprising conveying the second organic phase from the second plate decanter into at least one centrifuge thereby separating a wastewater phase from the second organic phase.

11. The continuous process according to claim 9, further comprising conducting the second organic phase from the second plate decanter into at least one coalescer decanter thereby separating the second organic phase into a wastewater phase and a third organic phase.

12. The continuous process according to claim 11, further comprising conveying the third organic phase from the at least one coalescer decanter into at least one centrifuge thereby separating the third organic phase into a wastewater phase and a fourth organic phase.

13. The continuous process according to claim 9, further comprising conveying the second organic phase from the second plate decanter into the first centrifuge of a cascade of centrifuges $Cfg_k$ arranged in series thereby separating a wastewater phase $W_k$ from the second organic phase $O_k$ and conveying organic phase $O_{k-1}$ to the next centrifuge in series which separates the conveyed $O_{k-1}$ into an organic phase $O_k$ and a wastewater phase $W_k$.

14. The continuous process according to claim 13, wherein k=1, 2, or 3.

15. The continuous process according to claim 9, further comprising conveying the second organic phase from the second plate decanter into each of the first of a cascade of two sets of three centrifuges $Cfg_k$ arranged in parallel, wherein k=1, 2, 3, 4, 5, to 6 wherein $Cfg_1$, $Cfg_2$, $Cfg_3$, are arranged in series and $Cfg_4$, $Cfg_5$ and $Cfg_6$ are arranged in series thereby separating a wastewater phase $W_k$ from an organic phase $O_k$ and conveying organic phase $O_{k-1}$ into the next centrifuge in series which separates the conveyed $O_{k-1}$ phase into an organic phase $O_k$ and a wastewater phase $W_k$.

16. A continuous process for the removal of impurities from a reaction mixture comprising polycarbonate, comprising:

(a) providing a reaction mixture from a two-phase interfacial reaction for the preparation of polycarbonate;

(b) conveying the reaction mixture into an array comprising a plurality of units having an organic phase output and an aqueous phase output comprising at least one plate decanter wherein the array comprises m rows where each row consists of n units in series and wherein the organic phase output of each unit in each row is connected with the organic output of unit having the same value of n in other rows;

(c) combining the organic phase output of the last unit of each row of the array; and (d) conveying the organic phase from (c) into the first of cascade of centrifuges arranged in series.

17. The continuous process according to claim 16 wherein the array comprises at least one coalescer decanter.

18. A method of detecting the location of an interface between two phases comprising:

providing a vessel;

introducing a reaction mixture into the vessel wherein the reaction mixture is the product of a two-phase interfacial reaction for the preparation of polycarbonate;

separating the reaction mixture into two phases having an interface therebetween;

emitting sonic waves which contact the interface and reflect therefrom; and measuring the reflected waves to determine the location of the interface.

19. A method according to claim 18 wherein the vessel is a plate decanter.

20. A method according to claim 18 wherein the vessel is a coalescer decanter.

* * * * *